US008512460B2

(12) United States Patent
Moniwa et al.

(10) Patent No.: US 8,512,460 B2
(45) Date of Patent: Aug. 20, 2013

(54) CARBON DIOXIDE RECOVERY SYSTEM

(75) Inventors: Shinobu Moniwa, Kawasaki (JP);
Nobuyuki Ashikaga, Kawasaki (JP);
Yasuhiko Nagamori, Fuchu (JP);
Hiroyuki Tokimoto, Kawasaki (JP);
Satomi Ebihara, Tokyo (JP); Masato Oda, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 194 days.

(21) Appl. No.: 12/878,413

(22) Filed: Sep. 9, 2010

(65) Prior Publication Data

US 2011/0056377 A1      Mar. 10, 2011

(30) Foreign Application Priority Data

Sep. 10, 2009  (JP) .............................. P2009-208839

(51) Int. Cl.
*B01D 53/14* (2006.01)
*B01D 53/62* (2006.01)

(52) U.S. Cl.
USPC ............................................. 96/240; 96/241

(58) Field of Classification Search
USPC ..................... 96/240, 241, 242; 95/178, 179, 95/183, 195, 196, 236; 423/220, 228, 229; 210/269, 275, 193, 777, 778
See application file for complete search history.

(56) References Cited

U.S. PATENT DOCUMENTS

| | | | | |
|---|---|---|---|---|
| 4,292,286 A | * | 9/1981 | Say et al. | 423/223 |
| 4,341,746 A | * | 7/1982 | Sarsten et al. | 423/228 |
| 4,798,910 A | * | 1/1989 | Herrin | 564/497 |
| 5,385,678 A | * | 1/1995 | Witt | 210/777 |
| 7,938,889 B2 | | 5/2011 | Iijima | |
| 2008/0203036 A1 | * | 8/2008 | Iijima et al. | 210/798 |
| 2009/0193970 A1 | * | 8/2009 | Iijima | 95/186 |
| 2010/0092359 A1 | * | 4/2010 | Svendsen et al. | 423/230 |
| 2011/0256043 A1 | * | 10/2011 | Blair et al. | 423/228 |

FOREIGN PATENT DOCUMENTS

| | | |
|---|---|---|
| AU | 2008207562 A1 | 8/2009 |
| CA | 2639168 A1 | 8/2009 |
| EP | 1 967 250 A1 | 9/2008 |
| EP | 2085133 A1 | 8/2009 |
| JP | 2004-057983 A | 2/2004 |
| JP | 2005-329405 A | 12/2005 |
| JP | 2008-207123 | 9/2008 |
| JP | 2008-238113 | 10/2008 |
| JP | 2009-179546 A | 8/2009 |
| RU | 2390371 C1 | 5/2010 |

OTHER PUBLICATIONS

"Notice of Reasons for Refusal," mailed Aug. 9, 2011, from the Japanese Patent Office in counterpart Japanese Patent Application No. 2009-208839, along with English translation thereof (14 pages).

* cited by examiner

*Primary Examiner* — Frank Lawrence, Jr.
(74) *Attorney, Agent, or Firm* — Finnegan, Henderson, Farabow, Garrett & Dunner, L.L.P.

(57) ABSTRACT

A carbon dioxide recovery system according to the present embodiments includes: an absorber bringing exhaust gas containing carbon dioxide into contact with absorbent reversibly absorbing or releasing carbon dioxide at above or below a predetermined temperature, and making the absorbent absorb carbon dioxide in the exhaust gas; a regenerator releasing carbon dioxide in the absorbent by heating the absorbent absorbing carbon dioxide at the absorber; a reflux pipeline flowing back the absorbent regenerated at the regenerator to the absorber; and a filter introducing at least a part of the absorbent, removing solids accumulated in the introduced absorbent, and returning the absorbent after the solids are removed to a vicinity of a portion where the absorbent is introduced.

9 Claims, 3 Drawing Sheets

CARBON DIOXIDE RECOVERY SYSTEM

CROSS-REFERENCE TO RELATED APPLICATIONS

This application is based upon and claims the benefit of priority from the prior Japanese Patent Application No. 2009-208839, filed on Sep. 10, 2009; the entire contents of which are incorporated herein by reference.

FIELD

Embodiments described herein relate generally to a carbon dioxide recovery system recovering carbon dioxide contained in exhaust combustion gas of fossil fuel (for example, coal) in a power generating system and so on.

BACKGROUND

At present, discharge suppression of greenhouse effect gas has been globally addressed from a point of view of global warming. There is discharge suppression of carbon dioxide being the greenhouse effect gas as one of the above. Addresses relating to a power generating system such as usage of natural energy, promotion of nuclear power generation, energy saving, and making power generation efficiency higher have been made positively.

Besides, an art recovering carbon dioxide from the exhaust combustion gas using the fossil fuel occupying a major part of power generation amount has been developed as a carbon dioxide discharging method by renovation and improvement of current power generation technology. There are an absorption method using a solid absorbent, a pressure swing absorption method and a temperature swing absorption method being a derived technology of the absorption method, a thermo-alkali method using alkali metal salt solution, a membrane separation method using organic polymer having a fine pore size and an inorganic material, and so on in gas separation and purification technologies recovering carbon dioxide contained in the exhaust combustion gas. There is an amine method using a chemical absorption action of absorbent of which main ingredient is alkanolamine as a most focused method from all over the world among the above.

In the amine method, an absorbing operation making the absorbent of which main ingredient is alkanolamine absorb carbon dioxide, and a regeneration operation of the absorbent by making carbon dioxide kept in the absorbent release by performing a heat operation of the absorbent absorbing carbon dioxide are performed. It is necessary to supply heat from outside of a system for the regeneration operation of the absorbent.

A major energy required for the carbon dioxide recovery in the amine method is the heat for the regeneration operation. When the exhaust combustion gas of the fossil fuel is an object to be processed of the carbon dioxide recovery, it is often the case that combustion heat of the fossil fuel is used as a heat source for the regeneration operation of the absorbent. Accordingly, a device configuration of which heat quantity necessary for the carbon dioxide recovery is small is required.

Besides, when coals and so on are used for the fuel, sulfur oxide, particulates, and so on are mixed in the exhaust combustion gas. The sulfur oxide, the particulates, and so on are usually removed by a removing process, but remaining minute amounts of minor components of these sulfur oxide, particulates, and so on are accumulated in the absorbent, and there is a possibility in which influences such as stains of a heat exchanger and a transportation machine (for example, pumps), and a change in absorbent characteristics occur. Besides, there is a possibility in which a deterioration product of the absorbent and a corrosion product of structural materials may have similar effects. Accordingly, the above-stated impurities (minor components) accumulated in the absorbent are necessary to be removed immediately. Besides, it becomes necessary to establish an art of which loss of the absorbent and heat loss in accordance with the removal are small.

A method in which a filtration membrane apparatus is provided in a carbon dioxide recovery system, a vaporizer heating and concentrating impurity containing solution collected by the filtration membrane apparatus is disposed to remove solids accumulated in the absorbent of the carbon dioxide recovery system (JP-A 2008-207123 (KOKAI)), and a method in which an anion exchange resin tower is provided inside a carbon dioxide recovery system, a solid-liquid separator is disposed at a previous stage thereof to remove solids and anion impurities in the absorbent (JP-A 2008-238113 (KOKAI)) are proposed to solve the above-stated problems.

An operation in the filtration membrane apparatus is not clearly described in JP-A 2008-207123 (KOKAI), and there is a possibility that heat energy held by the absorbent to be a high temperature of 100° C. or more discharged from a regeneration tower may be lost. Besides, there is no description relating to a filtration membrane material used under the high temperature environment, and there is a possibility in which impurities are eluted into the absorbent by an eluting material from the membrane material depending on a selected material.

The method in which ionic impurities are removed by the anion exchange resin is described in JP-A 2008-238113 (KOKAI). However, it is known that cation impurities derived from an anion exchange group having an amino group is eluted resulting from deterioration in an ion exchange group of an ion exchange resin. Accordingly, a countermeasure for the cation impurities is normally taken at a subsequent stage of the anion exchange resin by a cation exchange resin and so on, but there is a problem in an operation under the absorbent to be an alkali environment containing high concentration alkanolamine.

Further, the anion exchange resin tower is provided to remove organic acid resulting from an oxidized deterioration product of alkanolamine in JP-A 2008-238113 (KOKAI), but the ion exchange group held by the anion exchange resin is known to have low heat resistance and oxidation deterioration resistance. Accordingly, there is a problem that the elution of cation occurs from the anion exchange group having amino group, and the impurities in the absorbent increase if the anion exchange resin is used under the environment in which alkanolamine is oxidized and deteriorated. Besides, there is a possibility in which the heat loss occurs caused by the stains of the equipments such as the heat exchanger disposed on a circulation path of the absorbent resulting from the impurities. An object of the present embodiments is to provide a carbon dioxide recovery system suppressing the heat loss.

A carbon dioxide recovery system according to the present invention includes: an absorber bringing exhaust gas containing carbon dioxide into contact with absorbent reversibly absorbing or releasing carbon dioxide at above or below a predetermined temperature, and making the absorbent absorb carbon dioxide in the exhaust gas; a regenerator releasing carbon dioxide in the absorbent by heating the absorbent absorbing carbon dioxide at the absorber; a reflux pipeline flowing back the absorbent regenerated at the regenerator to the absorber; and a filter introducing at least a part of the absorbent, removing solids accumulated in the introduced absorbent, and returning the absorbent after the solids are removed to a vicinity of a portion where the absorbent is introduced.

The filter is made up of a separation membrane made of a fluorocarbon resin, or made up of a material in which filter media in fine particle states are held by a mesh.

A material made of nickel group alloy is suitable for the filter media in the fine particle states and the mesh.

When the filter in which the filter media in the fine particle states are held by the mesh is made up of the nickel group alloy, a specific gravity of the filter media becomes heavier than the solids supplemented from the absorbent, and therefore, it is possible to repeatedly use the filter media by separating the filter media and the supplemented solids by a specific gravity difference, collecting the filter media, and introducing them into the filter again when the filter is backwashed.

DETAILED DESCRIPTION

Hereinafter, embodiments of the present invention are described in detail with reference to the drawings.
(First Embodiment)

Figure 1:
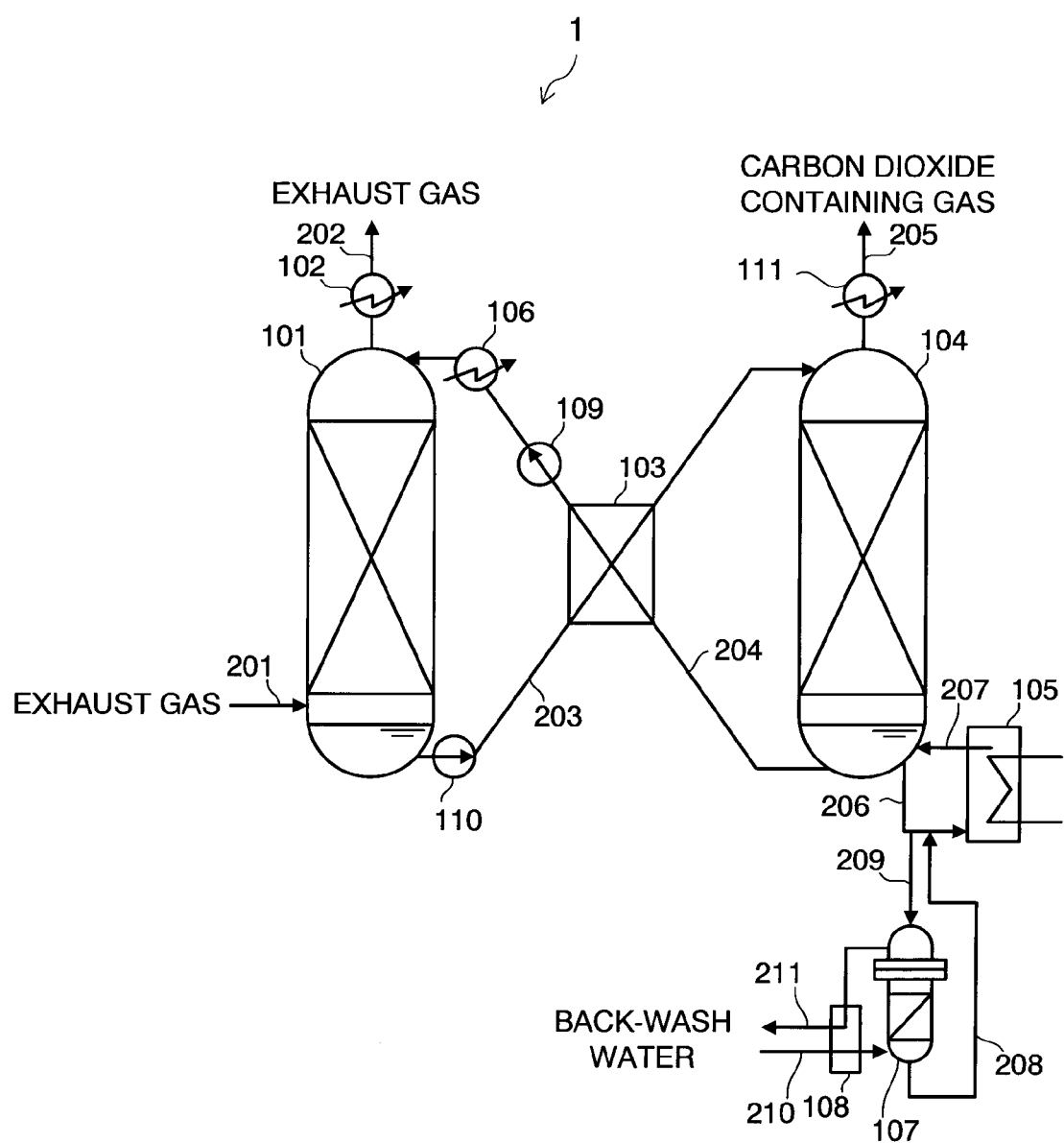
FIG. 1 is a view illustrating a configuration of a carbon dioxide recovery system according to a first embodiment.

A carbon dioxide recovery system 1 according to a first embodiment includes an absorber 101, an exhaust gas cooler 102, a heat exchanger 103, a regenerator 104, a reboiler 105 (reheater), an absorbent cooler 106, a filter 107, a heat exchanger 108, a pump 109, a pump 110 and an exhaust gas cooler 111 as illustrated in FIG. 1.

Exhaust gas (gas to be processed) generated at a not-illustrated power generator is introduced into the absorber 101 from an exhaust gas introducing path 201. This exhaust gas contains carbon dioxide generated by combustion of coals at the power generator. The exhaust gas is introduced into a lower portion of the absorber 101 via the exhaust gas introducing path 201 after processes such as denitration, dust extraction, desulfurization and cooling are performed. The absorber 101 brings the introduced exhaust gas into contact with absorbent absorbing carbon dioxide, to make the absorbent absorb carbon oxide contained in the exhaust gas.

The absorbent is supplied from an upper portion of the absorber 101, and it is brought into countercurrent contact with the exhaust gas introduced from the lower portion of the absorber 101. The exhaust gas after carbon dioxide is absorbed by the absorbent is discharged from an exhaust gas deriving path 202 at an upper portion of the absorber 101. The exhaust gas cooler 102 cools the exhaust gas discharged from the exhaust gas deriving path 202. A publicly known art may be used to cool the exhaust gas.

For example, a solution containing alkanolamine can be used for the absorbent, and a composition, a kind, and so on thereof are not particularly limited. An operation temperature of the absorber 101 may be arbitrary set depending on the composition, the kind of the absorbent and a regeneration degree of the absorbent. For example, the absorber 101 is operated so that the temperature of the internal absorbent becomes within a range of approximately from 30° C. to 70° C.

The absorbent absorbing carbon dioxide contained in the exhaust gas at the absorber 101 is discharged from an absorbent discharging path 203, and introduced into an upper portion of the regenerator 104 by the pump 110.

The absorbent after the absorption of carbon dioxide introduced from the absorber 101 is heated to release carbon dioxide from the absorbent, and the absorbent is regenerated at the regenerator 104. The reboiler 105 is used for the heating of the absorbent. The reboiler 105 heats the absorbent introduced into the regenerator 104 from a bottom portion via an absorbent introducing path 206. The absorbent after the heating is returned to the regenerator 104 via an absorbent discharging path 207.

An operation temperature of the regenerator 104 may be arbitrary set based on the kind and the composition of the absorbent, a carbon dioxide content contained in the absorbent and so on. For example, the regenerator 104 is operated so that the temperature of the absorbent becomes within a range of 100° C. to 200° C. Gas containing carbon dioxide released from the absorbent by the heating (carbon dioxide containing gas) is discharged from a carbon dioxide containing gas discharging path 205 at an upper portion of the regenerator 104. The exhaust gas cooler 111 cools the carbon dioxide containing gas discharged from the carbon dioxide containing gas discharging path 205. A publicly known art may be used for the exhaust gas cooler 111.

The absorbent releasing carbon dioxide at the regenerator 104 is discharged from an absorbent discharging path 204, to be introduced into an upper portion of the absorber 101 by the pump 109. The absorbent cooler 106 cools the absorbent introduced into the absorber 101 via the absorbent discharging path 204 until it becomes an arbitrary set temperature. The absorbent introduced into the absorber 101 is reused as a carbon dioxide absorption medium in the absorber 101.

The heat exchanger 103 performs a heat exchange between the absorbent (low temperature) flowing in the absorbent discharging path 203 and the absorbent (high temperature) flowing in the absorbent discharging path 204. Namely, the heat exchanger 103 cools the absorbent introduced into the absorber 101, and heats the absorbent introduced into the regenerator 104.

At least a part of the absorbent flowing in the absorbent introducing path 206 is introduced into the filter 107 as filtering object solution via an absorbent introducing path 209. A desulfurization process is performed for the exhaust gas introduced into the absorber 101 via the exhaust gas introducing path 201 before it is introduced into the absorber 101 so as to extract dusts by an electrical dust collector and so on and to remove sulfur oxide. However, minute amounts of particulates and sulfur oxide component (minor component) which cannot be removed by the above processes are mixed into the exhaust gas, and a part thereof is accumulated in the absorbent. Besides, various impurities such as oxidation deterioration products of the absorbent and eluting materials from structural materials are accumulated in the absorbent. Solids among the minor components and the impurities accumulated in the absorbent are necessary to be removed immediately because there is a possibility in which influences such as strains of the heat exchanger and a transportation machine (for example, pumps), and a change in absorption characteristics may occur.

The filter 107 removes the solids accumulated in the high-temperature absorbent operated at 100° C. to 200° C. by means of the filtering. The absorbent of which solids are filtered by the filter 107 is returned to the absorbent introducing path 206 via an absorbent discharging path 208. The filter 107 includes a hollow fiber membrane (separation membrane) made of a fluorocarbon resin. The solids accumulated in the absorbent are removed by the hollow fiber membrane. The fluorocarbon resin hollow fiber membrane is a material capable of using under high temperature alkali environment such as, for example, an MF membrane made of PTFE.

A temperature of the filter 107 is operated in accordance with the temperature of the absorbent at the regenerator 104. It is desirable to return the absorbent after the filtering discharged from the filter 107 to a portion where the temperature and carbon dioxide content thereof are approximately the same as or near to the absorbent introduced via the absorbent introducing path 209.

The heat exchanger 108 performs a heat exchange between back-wash water flowing in a back-wash water introducing path 210 to which back-wash solution washing the heat exchanger 108 is introduced and back-wash water flowing in a back-wash water discharging path 211. Namely, the heat exchanger 108 heats the back-wash water introduced into the filter 107, and cools the back-wash water discharged from the filter 107.

It is possible to suppress the heat loss of the absorbent introduced from the absorbent introducing path 209 to the filter 107 by including the heat exchanger 108. Note that it is desirable to dispose two or more filters 107 in parallel, and introducing paths are switched to be used when the back-wash water is introduced into the filter 107.

As stated above, it is necessary to immediately remove the solids among the minor components and impurities accumulated in the absorbent because there is the possibility in which the influences such as the stains of the heat exchanger and the transportation machine (for example, pumps), and the change in the absorption characteristics may occur. The carbon dioxide recovery system 1 according to the first embodiment includes the filter 107 removing the solids and the solids are removed. Accordingly, it is possible to suppress the stains of the equipments such as the heat exchanger 103, the introducing and discharging paths of the absorbent, the absorbent cooler 106, the pumps 109, 110 disposed on these paths. Besides, it is possible to suppress deterioration of heat exchange efficiency at the heat exchanger 103, the reboiler 105, and so on, because the stains of the equipments can be suppressed.

The temperature of the filter 107 is operated in accordance with the temperature of the absorbent of the regenerator 104, and the absorbent after the filtering discharged from the filter 107 is returned to the portion where the temperature thereof is approximately the same as or near to the absorbent introduced via the absorbent introducing path 209. Accordingly, it is possible to remove the solids under a state in which the lowering of the temperature of the absorbent is suppressed, and the heat loss can be suppressed.

The heat exchanger 108 performing the heat exchange between the back-wash water flowing in the back-wash water introducing path 210 to which the back-wash solution washing the heat exchanger 108 is introduced and the back-wash water flowing in the back-wash water discharging path 211 is included, and therefore, it is possible to suppress the loss of the heat quantity held by the filter 107 in the back-wash process after the filtering.

As stated above, it is possible to remove the solids accumulated in the absorbent while suppressing the heat loss, according to the carbon dioxide recovery system 1 of the first embodiment. It is therefore possible to efficiently and appropriately recover carbon dioxide contained in the exhaust gas while suppressing consumption of heat energy.

(Second Embodiment)

Figure 2:
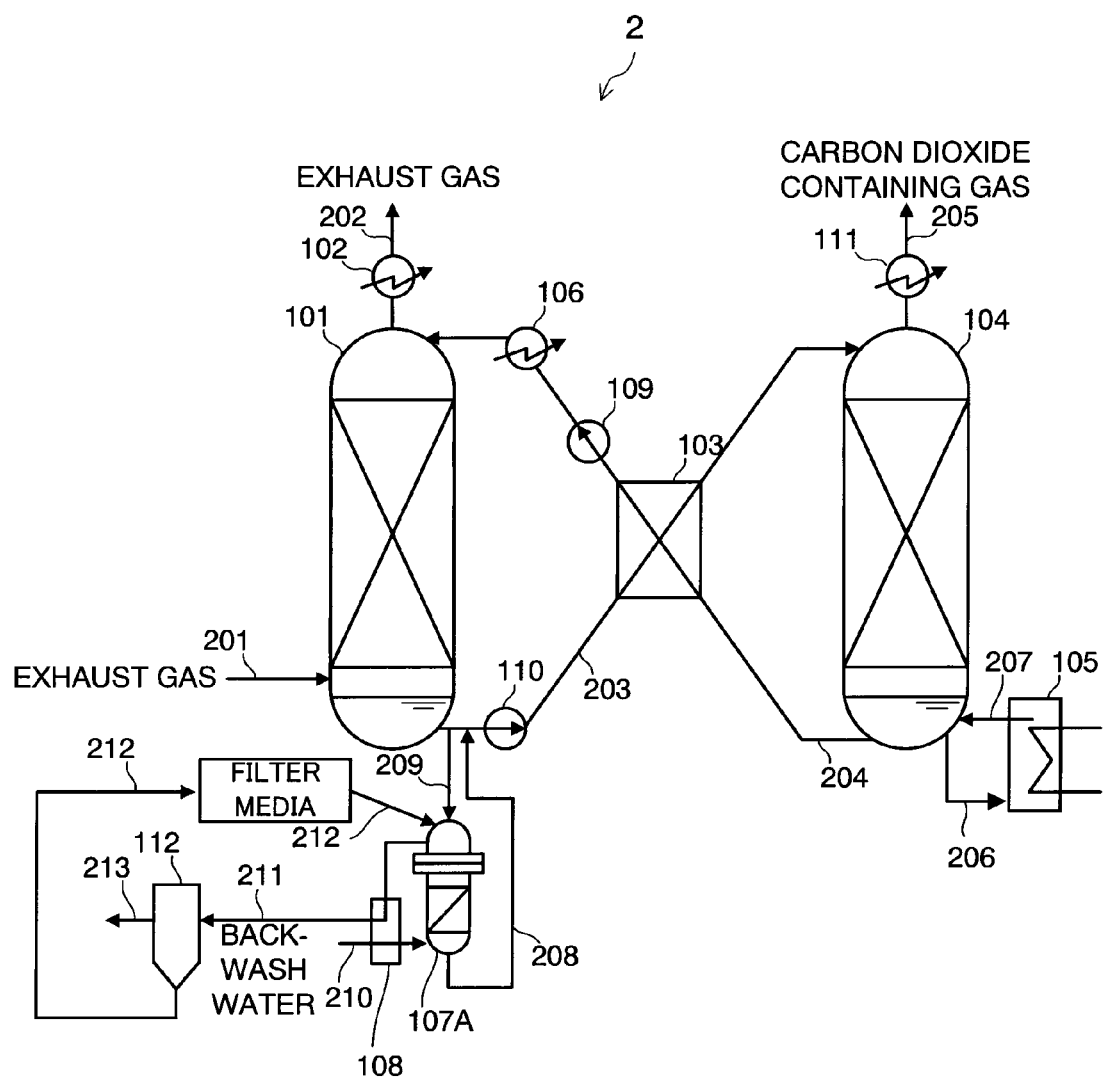
FIG. 2 is a view illustrating a configuration of a carbon dioxide recovery system according to a second embodiment.

FIG. 2 is a view illustrating a configuration of a carbon dioxide recovery system 2 according to a second embodiment. Hereinafter, the configuration of the carbon dioxide recovery system 2 is described with reference to FIG. 2. The same reference numerals are used to designate the same and corresponding components as the components described in FIG. 1, and the redundant description thereof will not be given.

The carbon dioxide recovery system 2 includes the absorber 101, the exhaust gas cooler 102, the heat exchanger 103, the regenerator 104, the reboiler 105 (reheater), the absorbent cooler 106, a filter 107A, the heat exchanger 108, the pump 109, the pump 110, the exhaust gas cooler 111 and a separator 112.

The filter 107A includes filter media in fine particle states removing the solids accumulated in the absorbent and a mesh surrounding the filter media. A material of the filter media and the mesh is a nickel group alloy excellent in heat resistance and alkali resistance. The absorbent introducing path 209 and the back-wash water introducing path 210 are disposed on the absorbent discharging path 203 in the second embodiment. It is desirable also in this case that the absorbent after the filtering discharged from the filter 107A is returned to the portion where the temperature and the carbon dioxide content thereof are approximately the same as or near to the absorbent introduced via the absorbent introducing path 209.

The separator 112 separates the solids contained in the back-wash water introduced via the back-wash water discharging path 211 and the filter media in the fine particle states at the back-wash time of the filter 107A. The filter media made up of the nickel group alloy is separated by the separator 112 being a solid-liquid separator because a specific gravity of the filter media is larger than the solid. The filter media separated by the separator 112 is collected, and repeatedly used by constituting the filter 107A again at the filter 107A via a filter media circulation path 212.

As stated above, the absorbent introducing path 209 and the back-wash water introducing path 210 are disposed at an upstream side of the absorbent discharging path 203, the filtering object at the filter 107A is set to be the absorbent after carbon dioxide is absorbed, and the solids accumulated from the exhaust gas to the absorbent is immediately removed, in the second embodiment. Accordingly, it is possible to suppress the stains of the equipments such as the absorbent discharging path 203, the heat exchanger 103 and the pump 110 disposed on the absorbent discharging path 203.

The filter media contained in the back-wash water discharged from the filter 107A are separated and collected by the separator 112. Accordingly, it is possible to reuse the filter media separated and collected by the separator 112, and to suppress a waste generation amount.

As stated above, according to the carbon dioxide recovery system 2 of the second embodiment, it is possible to suppress the stains of the equipments by suppressing diffusion of the solids being the impurities to the whole of the carbon dioxide recovery system 2 by immediately removing the solids contained in the exhaust gas. Accordingly, it is possible to efficiently and appropriately recover carbon dioxide contained in the exhaust gas while suppressing the consumption of the heat energy. Further, it is possible to suppress the waste generation amount because the filter media used for the removal of the solids can be reused.

(Third Embodiment)

Figure 3:
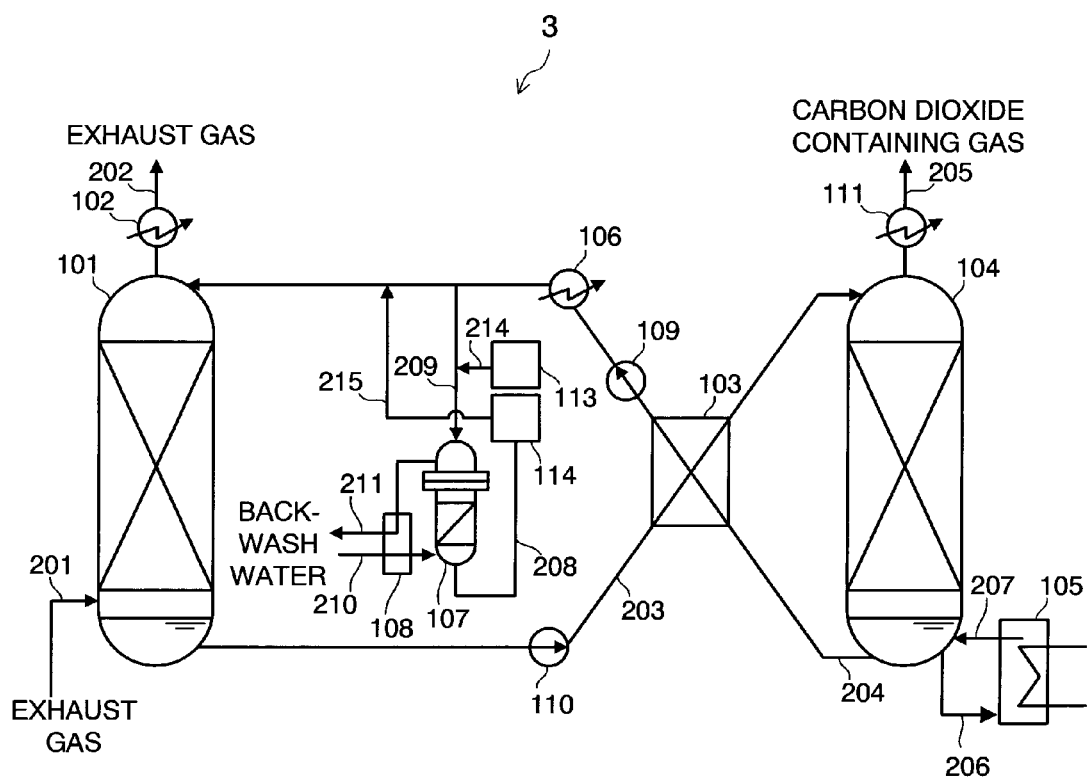
FIG. 3 is a view illustrating a configuration of a carbon dioxide recovery system according to a third embodiment.

FIG. 3 is a view illustrating a configuration of a carbon dioxide recovery system 3 according to a third embodiment. Hereinafter, the configuration of the carbon dioxide recovery system 3 is described with reference to FIG. 3. The same reference numerals are used to designate the same and corresponding components as the components described in FIG. 1, and the redundant description thereof will not be given.

The carbon dioxide recovery system 3 according to the third embodiment includes the absorber 101, the exhaust gas cooler 102, the heat exchanger 103, the regenerator 104, the reboiler 105 (reheater), the absorbent cooler 106, the filter 107, the heat exchanger 108, the pump 109, the pump 110, the exhaust gas cooler 111, an oxygen supply part 113 and a deoxidation part 114.

The oxygen supply part 113 supplies gas containing oxygen (oxygen-containing gas) to the absorbent flowing in the absorbent introducing path 209 via an oxygen-containing gas supplying path 214. An apparatus accelerating gas dissolution such as a line mixer, an apparatus generating fine bubbles (for example, a microbubble generating apparatus) may be used for the supply of oxygen to the absorbent by the oxygen supply part 113.

The deoxidation part 114 is disposed at a subsequent stage of the filter 107, and removes oxygen contained in the absorbent after the filtering discharged from the filter 107. A publicly known deoxidation technology of which influences on a replacement process by inert gas, a pressure reducing operation inside a tank and the absorbent composition of a gas separation membrane and so on are small may be used for the removal of oxygen at the deoxidation part 114. The absorbent of which containing oxygen is removed at the deoxidation part 114 is returned to the absorbent discharging path 204 via a deoxidation filterate discharging path 215.

There are organic acid generated by an operation of the carbon dioxide recovery system 3 using the absorbent and the eluting materials from the structural materials in addition to the minute amounts of particulates and sulfur oxide components contained in the exhaust gas introduced from the exhaust gas introducing path 201 among the impurities accumulated in the absorbent. This organic acid is generated because the absorbent is oxidatively decomposed by metal ions of which major constituent is oxygen contained in the exhaust gas and iron ions eluted from the structural materials.

The iron ions are known to accelerate the oxidative decomposition of the absorbent under existence of oxygen. Suppressions of the deterioration products generated by the oxidative decomposition of the absorbent and the increase of the absorbent consumption amount, and maintenance of the absorbent composition can be expected by immediately removing the iron ions. Accordingly, the oxygen-containing gas is supplied into the absorbent from the oxygen supply part 113 to improve oxygen partial pressure inside the system, and thereby, formation of iron oxide of the iron ions is accelerated, and the formed iron oxide is removed by the filter 107 at the subsequent stage in the carbon dioxide recovery system 3 according to the third embodiment.

The impurities derived from the iron ions which become the iron oxide (solid) by the supply of oxygen are removed at the filter 107, and an iron ion concentration in the absorbent decreases. Accordingly, it is possible to suppress deterioration of the absorbent caused by oxidation.

Besides, the absorbent introducing path 209 and the deoxidation filterate discharging path 215 are disposed on the absorbent discharging path 204 at the subsequent stage of the heat exchanger 103 in the third embodiment. The temperature of the absorbent flowing at the subsequent stage of the heat exchanger 103 is lower than the temperature of the absorbent inside the regenerator 104, and therefore, it is suitable to dissolve the oxygen-containing gas. Besides, it is possible to suppress an oxygen amount mixed into the carbon dioxide containing gas discharged from the regenerator 104 via the carbon dioxide containing gas discharging path 205 compared to cases when the absorbent introducing path 209 and the deoxidation filterate discharging path 215 are disposed to the absorbent after carbon dioxide is absorbed and on a path circulating in the regenerator 104.

Note that it is desirable that the absorbent after the filtering discharged from the filter 107 is returned to the portion where the temperature and the carbon dioxide content thereof are approximately the same as or near to the absorbent introduced via the absorbent introducing path 209 as same as the first embodiment.

As stated above, it is possible to suppress the deterioration of the absorbent and the generation of the impurities according to the deterioration, and the absorbent consumption amount by removing the solids contained in the exhaust gas and removing the iron ion components generated inside the system according to the carbon dioxide recovery system 3 of the third embodiment. Besides, it is possible to suppress the diffusion of the impurities to the whole of the carbon dioxide recovery system 3 and to suppress the stains of the equipments by immediately removing the solids contained in the exhaust gas and the iron ions. Accordingly, it is possible to efficiently and appropriately recover carbon dioxide contained in the exhaust gas while suppressing the consumption of the heat energy.

(Other Embodiment)

It should be noted that the present invention is not limited to the above-described embodiments as they are, and in an implementation stage, it can be embodied by modifying components thereof within a range not departing from the spirit of the invention. Also, the plural components disclosed in the above-described embodiments can be appropriately combined to form various inventions. For example, some of all the components shown in the embodiments may be eliminated. Moreover, components from different embodiments may be combined appropriately.

Specifically, the filter 107 included by the carbon dioxide recovery system 1 according to the first embodiment or the carbon dioxide recovery system 3 according to the third embodiment may be changed to the filter 107A included by the second embodiment. At this time, the oxygen supply part 113 may be disposed at the subsequent stage of the filter 107A. Besides, a disposed position of the filter 107 or the filter 107A included by the carbon dioxide recovery systems 1 to 3 according to the first to the third embodiments may be changed to the disposed position in the other embodiments.

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form of the devices and methods described herein may be made without departing from the spirit of the inventions. The accompanying claims and their equivalents are intended to cover such forms or modifications as would fall within the scope and spirit of the inventions.

What is claimed is:

1. A carbon dioxide recovery system, comprising:
   an absorber bringing exhaust gas containing carbon dioxide into contact with absorbent reversibly absorbing or releasing carbon dioxide at above or below a predetermined temperature, and making the absorbent absorb carbon dioxide in the exhaust gas;
   a regenerator releasing carbon dioxide in the absorbent by heating the absorbent absorbing carbon dioxide at the absorber;

a reflux pipeline flowing back the absorbent regenerated at the regenerator to the absorber; and a filter introducing at least a part of the absorbent, removing solids accumulated in the introduced absorbent, and returning the absorbent after the solids are removed to a vicinity of a portion where the absorbent is introduced, wherein the filter is disposed on a discharging path from the regenerator to a reheater heating the absorbent.

2. The carbon dioxide recovery system according to claim 1,
wherein the filter is made up of a separation membrane made of a fluorocarbon resin.

3. The carbon dioxide recovery system according to claim 1,
wherein the filter is made up of a material in which filter media in fine particle states are held by a mesh.

4. The carbon dioxide recovery system according to claim 3, further comprising,
a separator separating the solids and the filter media,
wherein the filter media separated by the separator are reused.

5. The carbon dioxide recovery system according to claim 1, further comprising,
a heat exchanger performing a heat exchange between back-wash solutions washing the filter flowing in an introducing path and in a discharging path.

6. The carbon dioxide recovery system according to claim 1, further comprising,
an oxygen supply part supplying oxygen-containing gas to the absorbent introduced into the filter.

7. The carbon dioxide recovery system according to claim 1, further comprising,
a deoxidation part removing oxygen contained in the absorbent discharged from the filter.

8. The carbon dioxide recovery system according to claim 1,
wherein at least two or more filters are disposed in parallel.

9. A carbon dioxide recovery system, comprising:
an absorber bringing exhaust gas containing carbon dioxide into contact with absorbent reversibly absorbing or releasing carbon dioxide at above or below a predetermined temperature, and making the absorbent absorb carbon dioxide in the exhaust gas;
a regenerator releasing carbon dioxide in the absorbent by heating the absorbent absorbing carbon dioxide at the absorber;
a reflux pipeline flowing back the absorbent regenerated at the regenerator to the absorber; and
a filter introducing at least a part of the absorbent, removing solids accumulated in the introduced absorbent, and returning the absorbent after the solids are removed to a vicinity of a portion where the absorbent is introduced,
wherein the filter is disposed on a discharging path from the absorber to the regenerator.

* * * * *